United States Patent [19]

Holm et al.

[11] 4,251,573

[45] Feb. 17, 1981

[54] METHOD FOR RUST-PROTECTING TREATMENT

[75] Inventors: Claes H. Holm; John Paulsson, both of Hässleholm, Sweden

[73] Assignee: Tuff-Kote Dinol Aktiebolag, Hässleholm, Sweden

[21] Appl. No.: 952,489

[22] Filed: Oct. 18, 1978

Related U.S. Application Data

[63] Continuation of Ser. No. 828,196, Aug. 26, 1977, abandoned, which is a continuation-in-part of Ser. No. 779,915, Mar. 21, 1977, abandoned.

[51] Int. Cl.³ .......... C01C 3/00

[52] U.S. Cl. .......... 427/236; 118/317; 118/323; 427/421; 427/239

[58] Field of Search .......... 427/236, 230, 421, 239; 118/317, 408, 306, 323; 239/154, 588, 229, 195, 561

[56] References Cited

U.S. PATENT DOCUMENTS 2,930,531 3/1960 Kennedy .......... 239/229

OTHER PUBLICATIONS

Atlas Copco, (Ecco Spray Equipment), Pamphlet—Cited by Applicant.

*Primary Examiner*—Sam Silverberg
*Attorney, Agent, or Firm*—Brumbaugh, Graves, Donohue & Raymond

[57] ABSTRACT

A method for applying a rust-protecting agent in straight as well as curved hollow spaces by means of spraying, either with air or airless, utilizes a flexible hose provided at its front end with a nozzle arranged to provide a radially directed circular spray field. The hose is introduced in the space to be treated and a rust protecting agent is introduced through said hose and the nozzle under such a pressure that the front end of the hose carrying the nozzle partly raises from the inner surface of the space. The hose is withdrawn through all the space.

4 Claims, 3 Drawing Figures

METHOD FOR RUST-PROTECTING TREATMENT

This is a continuation of application Ser. No. 828,196, filed Aug. 26, 1977, which is a continuation-in-part of application Ser. No. 779,915 filed on Mar. 21, 1977, both now abandoned.

BACKGROUND OF THE INVENTION

The present invention relates to a method for spraying a rust-protecting agent on the interior surfaces of straight and curved cavities by means of spraying.

The object of the present invention is to obtain a method for total application of a rust-protecting agent in narrow cavities, straight as well as curved ones, whereby the nozzle through which the rust-protecting agent is sprayed, airless or aircontaining, shall reach as near as possible the surfaces which are to be treated.

A further object is simultaneously to clean and to drive away dirt by means of said spraying.

It has previously been known to use nozzles having an axially through-bore for spraying of rust-protecting agents. When such a nozzle has been used for spraying in an enclosed space, e.g. in a frame side member of a motor vehicle, it is usually mounted on a tube bent at an angle. The tube together with the nozzle is introduced into the space through an access hole bored into the enclosed space. In order to obtain an equal distribution of the rust-protecting agent on all the walls of the space the nozzle is turned around during the subsequent spraying. It has, however, turned out to be difficult to obtain a coating of all surfaces of the rust-protecting agent and simultaneously avoid excess spraying of certain surfaces. Moreover, spraying by this method takes a relatively long time. Another drawback is that under certain circumstances it may be difficult to introduce a curved tube into the space to be rust-protected.

Prior art also includes nozzles having a central inlet bore and an outlet channel connected perpendicular thereto. Nozzles of this type are common as outlets nozzles on aerosole packages, and are not used for spraying in closed spaces because they spray in only one direction. Moreover, such nozzles have not been constructed for spraying of liquids under the high pressures which are utilized in industrial rust protecting treatment, i.e. 5–15 MPa and in certain cases more.

It is also known to arrange a sector-spraying nozzle on a straight tube, which is introduced in a straight chamber, whereupon during withdrawal of the tube a rust-protecting agent may be applied.

These known methods, however, suffer from a number of drawbacks. For example, a great number of holes must be bored in a vehicle in order to reach all folds and pockets, and a hole must also be bored at each curve of a hollow space to assure application to all surfaces in the space. However, it is evident that too many holes reduce the mechanical strength of the detail in question. Likewise such holes raise the risk for rust action in the holes per se as these often are placed on exposed places.

Moreover, it takes a considerable amount of time to bore all these holes, and to apply a rust-protecting agent by means of a curved nozzle in each of these holes, which raises labor costs considerably. It also increases the consumption of rust-protecting agents, which raises material costs.

SUMMARY OF THE INVENTION

However, we have now shown, by the present invention, how to overcome these drawbacks. A flexible hose is introduced in the hollow space intended to be treated. The front end of the hose is provided with a nozzle which gives a radially directed circular sprayfield. A rust-protecting agent is pumped through said hose under such a pressure that the front end of the hose carrying the nozzle partly raises from the inner surface of the hollow space. The hose is then withdrawn through all the hollow space at a steady rate while the rust-protecting agent is uniformly sprayed in the interior surface of the space.

According to a preferred embodiment of the invention the spraying nozzle is also provided with an axially directed spraying-bore, arranged to give an axially directed spraying field, preferably an axially directed, conical spraying field.

According to another preferred embodiment the rust-protecting agent is introduced by means of air-containing spraying, the pressure being preferably at least 0.5 MPa.

According to a further, preferred embodiment of the invention the nozzle intended for air-containing spraying is provided with an axially directed spraying-bore, arranged to give an axially directed spraying field, preferably an axially directed, conical spraying field.

According to another, further preferred embodiment of the invention a rotational torsion of the rear end of the hose gives an identical rotational torsion of the nozzle of the hose.

DESCRIPTION OF THE DRAWINGS

The present invention will be described more in detail below with reference to the appended drawings, wherein.

DESCRIPTION OF THE PREFERRED EMBODIMENT

Figure 1:
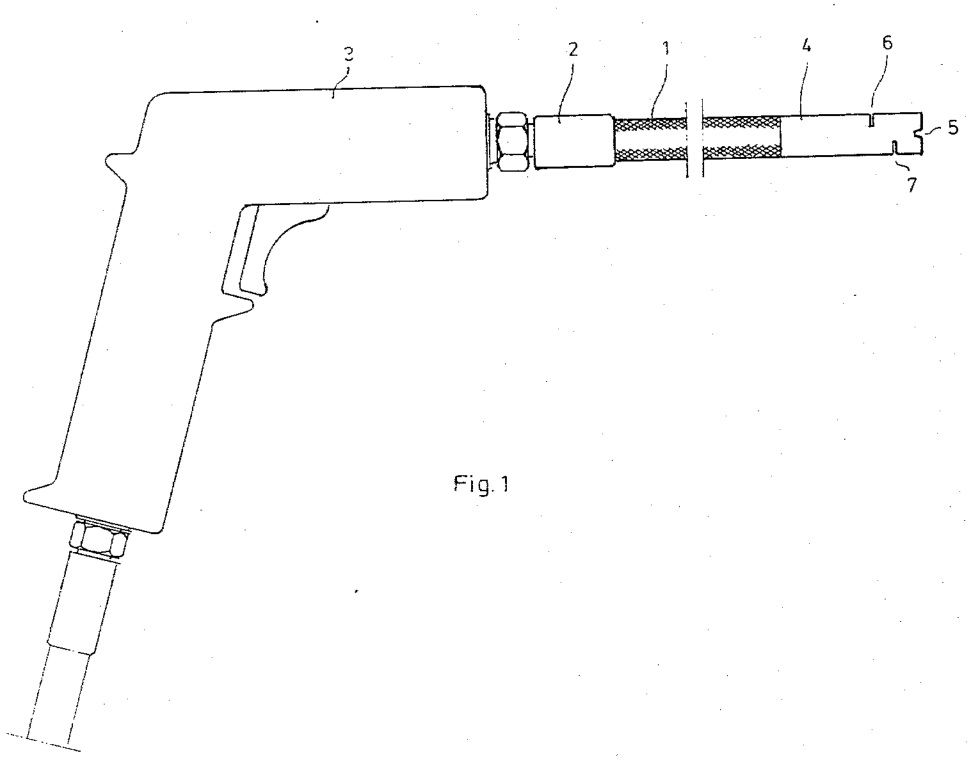
FIG. 1 shows a spraying pistol and nozzle for carrying out the present method.
Figure 2:
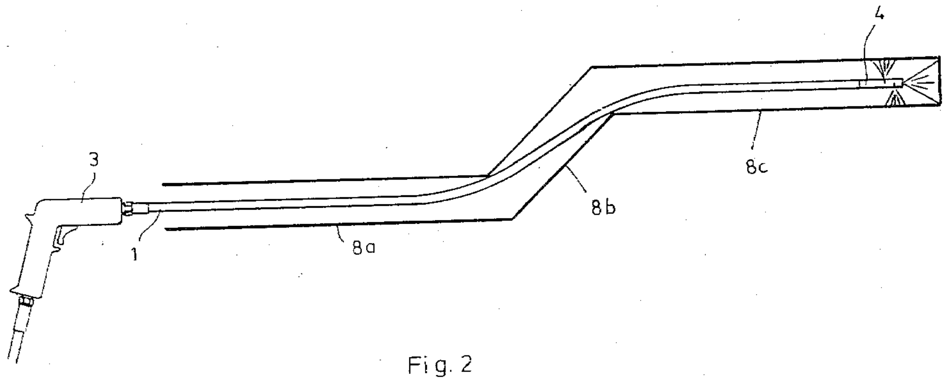
FIG. 2 schematically illustrates a bent enclosed space with the device of FIG. 1 in use.

Referring now to the drawings wherein like reference numerals designate identical or corresponding parts, and more particularly to FIG. 1, a flexible high-pressure hose 1 is connected at its rear end to a spraying pistol 3, and is connected at its front end to a cylindrical nozzle 4. The spraying pistol 3 is connected by a hose 5 to a container (not shown), which is put under pressure and contains a rust-protecting agent. The hose 1 in FIG. 1 is shown broken for clarity of illustration. The schematic diagram of FIG. 2 shows the actual proportions of a typical application.

The high-pressure hose 1 includes an inner flexible gas-impervious material such as PTFE tubing having an internal diameter of 3 mm and an outer diameter of 5 mm. The inner flexible tubing is protected against mechanical damage by an outer flexible sheath such as braided stainless steel having a thickness of about 0.25 mm. The hose has a weight of about 0.65 g/cm.

The spraying pistol 3 connected to the rear end of the high-pressure hose 1 is not critical and any good quality airless or air-mixing spraying pistol may be used. A typical pistol would be the Ecco 300 R made by Atlas Copco AB of Sweden.

Figure 3:
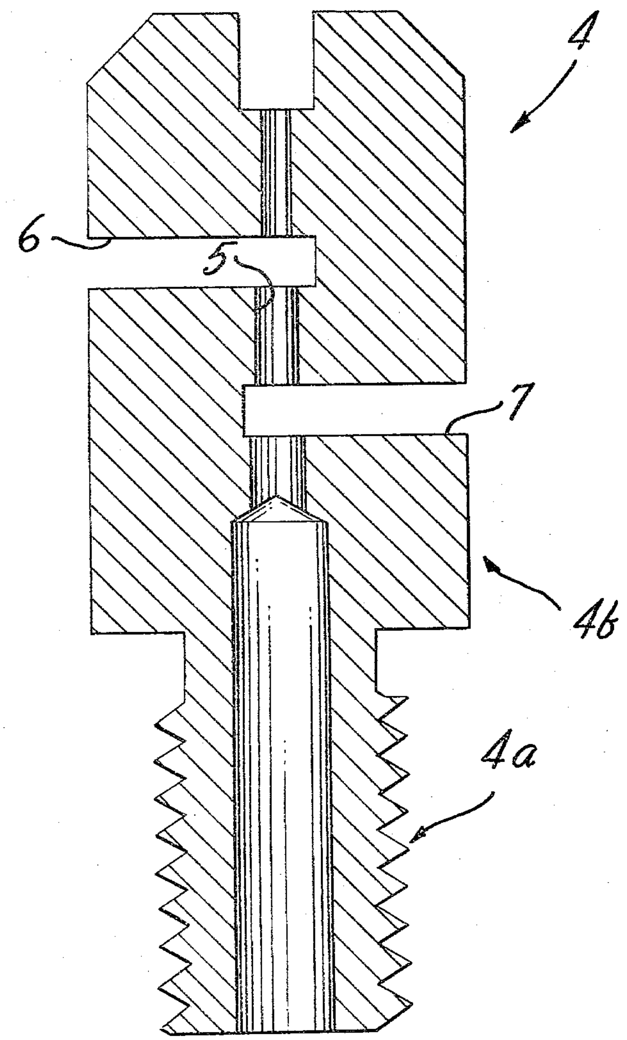
FIG. 3 is a cross-section of the nozzle of the device of FIG. 1.

The nozzle 4, best illustrated in FIG. 3 is formed of surface hardened steel and weighs about 1.7 g. The nozzle and the connector at the front end of the flexible hose 1 into which the nozzle 4 is screwed plus the forward part of the hose weighs about 10 grams. The outer diameter of the connector of the front and of the hose is about 7.9 mm and the outer diameter of the nozzle is about 6 mm which is about equal to the outer diameter of the flexible hose 1 to minimize the shoulders which could snag on internal partitions in the enclosed space and interupt the steady withdrawal of the hose from the space during spraying.

The rearward portion 4*a* of the nozzle is reduced in diameter and exteriorly threaded to enable it to be screwed into the interiorly threaded connector at the end of the flexible hose 1. The forward end 4*b* of the nozzle is provided with an axially directed centrally arranged bore 5 which preferably extends along the whole length of the nozzle. Two slots 6 and 7 are cut diagonally into the forward end 4*b* of the nozzle at about the ⅓ and ⅔ positions therealong, respectively. The slots 6 and 7 are both deep enough to cross the axial bore 5. The diameter of the bore steps down from slot to slot in order to maintain the spraying pattern constant between the two slots and to provide sufficient pressure at the axial end of the nozzle to give the optimum cone shaped spray pattern from the end. The bore is counter bored 1.5 mm in at its forward end to a diameter of 1.2 mm and then reduces in diameter between the counter bore in the first slot to 0.4 mm. Between the first and second slots the bore is 0.6 mm and behind the second slot increases in diameter to 0.8 mm. The bore in the rear end of the nozzle is 1.5 mm in diameter.

When carrying out the method according to the present invention the hose 1 connected to a spraying pistol 3 is introduced through a small opening in a narrow chamber 8 or system of chambers 8*a*, 8*b*, 8*c* e.g. in an automobile body work or in another bigger construction, whereby the hose may be of any suitable length, however, usually 1.5 to 2.5 m. The hose is introduced maximally, whereupon rust-protecting agent is introduced airless into the balk under a pressure of 5 MPa (mega pascals) through the nozzle. The front end of the hose will raise from the bottom surface of the chamber and in certain cases take a substantially central position in the balk. The hose is then withdrawn out of the chamber at an even rate, between 0.05 and 0.2 m/sec. About 7 liters of rust protecting agent will coat all the closed cavities in an average U.S. compact model automobile.

Various rust protecting agents may be used in the practice of this process. The following examples are agents sold by Tuff-Kote, Inc.

For airless spraying:

1. A tixothrop bitumen based agent containing waxes, resins, rust inhibitors and solvent such as white spirits. Viscosity: 47 centistroke (cSt) at 20° C.

For air-containing spraying:

2. A tixothrop agent containing waxes, rust inhibitors, and solvent, Viscosity: 3 Engler degrees (E°) at 20° C.

For airless or air-containing spraying:

3. Rust-protecting agent containing waxes, rust inhibitors and solvent. Viscosity: 10° E at 20 ° C.

Three other rust-protecting agents which may be used are:

4. An agent containing waxes, metal soaps, rust inhibitors, metal pigment and solvent. Viscosity: 100° E at 20° C.
5. A bitumen based agent. Viscosity 125° E at 20° C.
6. A bitumen based agent containing resins, rust inhibitors and solvent. Viscosity 577 centipoise (cP).

The viscosity of the rust protecting agent may of course vary more than indicated above. In such cases when very high viscosity is at hand the pressure applied to force the agent through the hose and nozzle and to allow the nozzle to raise must be much greater than when lower viscosities are at hand.

Under the high pressure at which the rust-protecting agent is sprayed from the nozzle, the agent will penetrate every groove and slot which may occur in the chamber and apply a continuous coating of 10-300 microns thick. Further, high pressure spray of rust-protecting agent tends to clean the interior surfaces of the chamber by blowing away dirt and rust particles from the surface of the balk. The end parts of the chamber will be sprayed by the axially directed bore.

The number of openings that must be bored to obtain access to the chamber for introducing a rust-protecting agent are minimized by means of the present invention.

We claim:

1. A method for applying a rust-protecting agent in straight as well as curved hollow spaces by means of airless spraying, comprising the steps of:

introducing a flexible hose horizontally into the hollow space to be treated, said hose having a nozzle disposed at its front end;

said nozzle formed to give a constant circular spray field directed radially from the bore of said hose;

introducing through said hose by airless dispensing means a rust-protecting agent under a steady pressure of at least four MPa such that the front end of the hose carrying the nozzle partly rises from the inner surface of the hollow space due to the forces exerted on the nozzle by the rust-protecting agent issuing therefrom thereby stably suspending the nozzle within the hollow space; and withdrawing the hose through all the hollow space.

2. The method according to claim 1, wherein the spray nozzle is also provided with an axially directed bore, to give an axially directed spray field.

3. The method according to claim 4, wherein the spray nozzle gives an axially directed, conical spray field.

4. A method according to claim 1, wherein the hose has sufficient torsional rigidity that a rotation of the rear end of the hose gives a corresponding rotation of the nozzle of the hose.

* * * * *

UNITED STATES PATENT AND TRADEMARK OFFICE

CERTIFICATE OF CORRECTION

PATENT NO. : 4,251,573

DATED : February 17, 1981

INVENTOR(S) : Claes Hakan Holm and John Paulsson

It is certified that error appears in the above-identified patent and that said Letters Patent are hereby corrected as shown below:

On Page 1, the following was omitted:

-- [30] Foreign Application Priority Data
March 22, 1976 [SE] Sweden ........ 7603498-2 --; and Column 4, line 54, "claim 4" should read -- claim 2 --.

Signed and Sealed this

*Fourteenth* Day of *July 1981*

[SEAL]

*Attest:*

GERALD J. MOSSINGHOFF

*Attesting Officer* *Commissioner of Patents and Trademarks*